March 21, 1950 R. R. FINN 2,501,601
AUTOMATIC DIE
Filed May 26, 1944 2 Sheets-Sheet 2
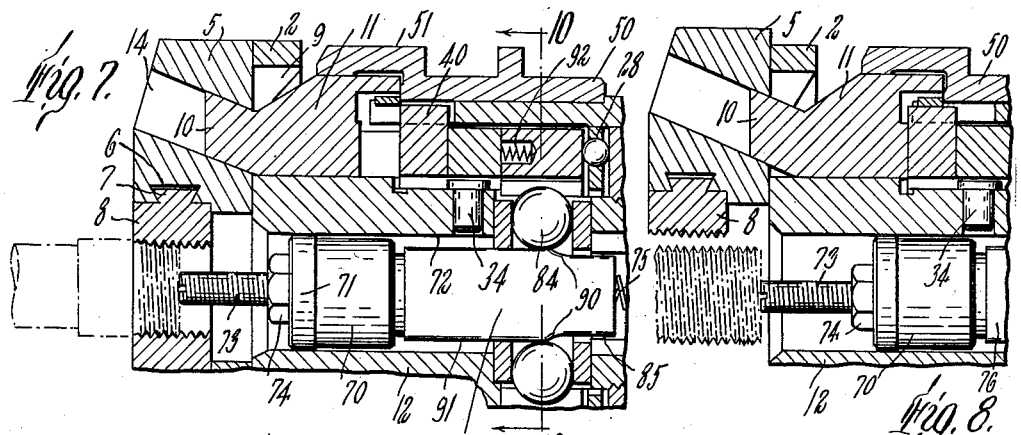
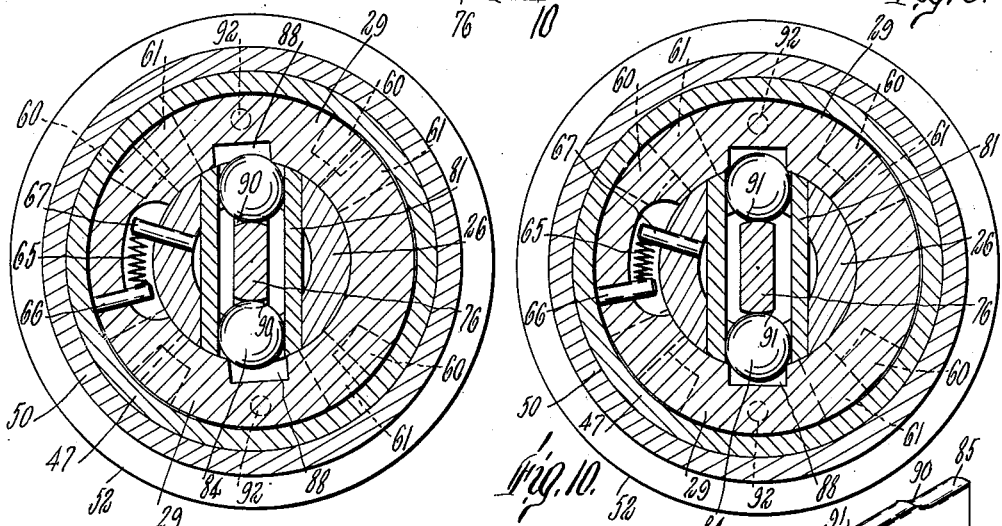
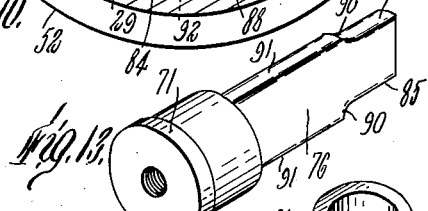
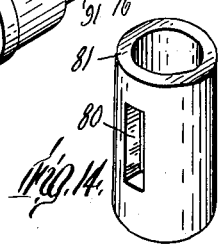
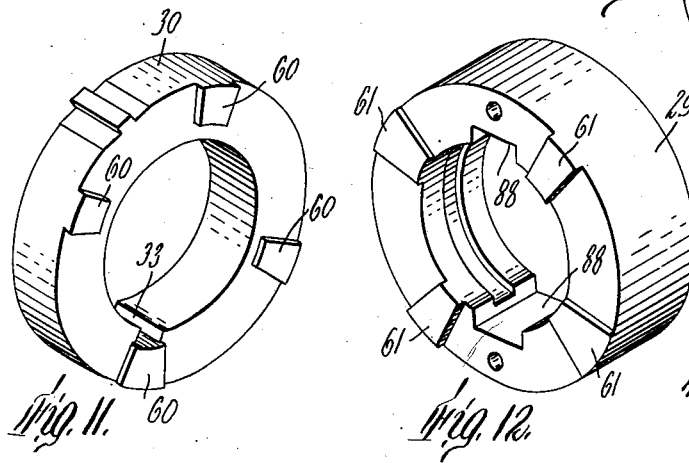
Inventor
Robert R. Finn March 21, 1950  R. R. FINN  2,501,601
AUTOMATIC DIE Filed May 26, 1944  2 Sheets-Sheet 1

Inventor
Robert R. Finn
by Wright, Brown, Quinby & May
Attys.

Patented Mar. 21, 1950

2,501,601

UNITED STATES PATENT OFFICE 2,501,601

AUTOMATIC DIE

Robert R. Finn, Springfield, Vt., assignor to Jones & Lamson Machine Company, Springfield, Vt., a corporation of Vermont Application May 26, 1944, Serial No. 537,419

9 Claims. (Cl. 10—95)

This invention relates to screw threading dies and has for an object to provide a die which will start to cut threads slightly under diameter, thus to facilitate starting of the threaded work cut thereby into a mating nut or other part. After the start of cutting under-size, the die then automatically cuts to the working size, and finally opens automatically at the end of the thread cutting operation. To this end the die is provided for three distinct chaser positions, a normally closed position for cutting the correct diameter being interposed between a die-open position and a starting closed position, the latter being arranged to cut threads slightly below the normal thread diameter. Means are provided for automatically adjusting the die from the starting closed condition after a predetermined extent of threading to the normal closed threading condition, and finally from the normal threading position to open position after the threading has proceeded for the desired distance.

In the accompanying drawings,

Figure 7 is a view similar to a portion of Figure 2, but showing the parts in normal die-closed positions.

Figure 8 is a fragmentary view similar to portions of Figures 2 and 7, but showing the parts in die-open positions.

Figure 1:
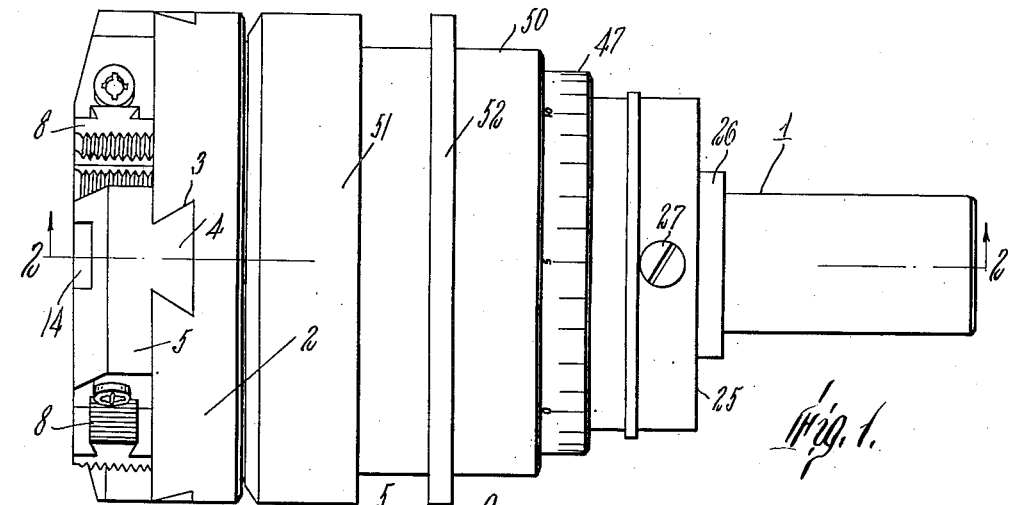
Figure 1 is a side elevation of a die embodying the invention and shown in starting thread cutting condition.
Figures 2, 4:
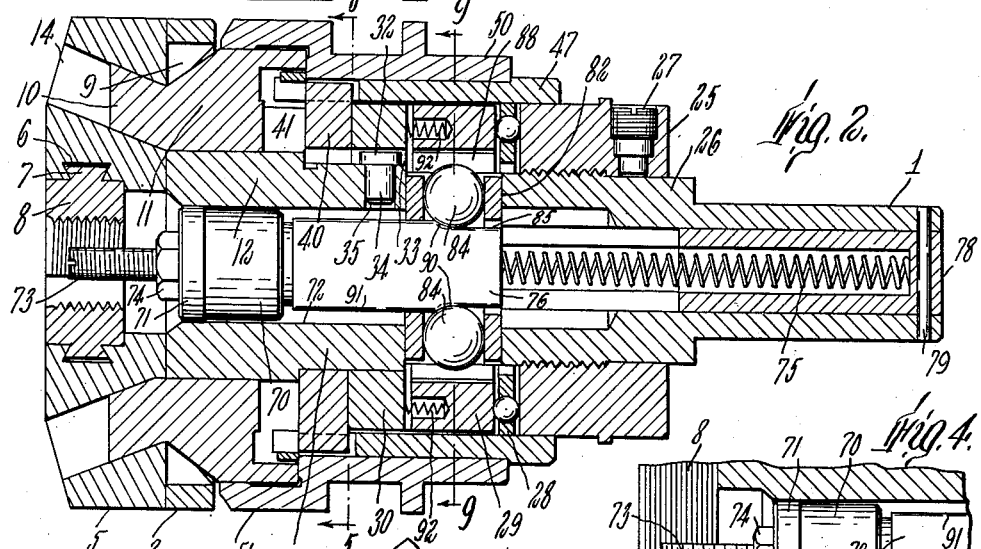
Figure 2 is a sectional view on line 2—2 of Figures 1 and 3.
Figure 4 is a detail sectional view on line 4—4 of Figure 3, but drawn to the scale of Figures 1 and 2.

Figures 9 and 10 are transverse sectional views through the die on lines 9—9 of Figure 2 and 10—10 of Figure 7, respectively.

Figures 11 to 14, inclusive, are isometric views of certain of the die parts.

Figure 6:
Figure 6 is a detail longitudinal sectional view of a threaded work piece showing exaggerated the reduced diameter and normal threaded portions.

Referring to the drawings, the die as shown is of the general type shown in the Bysshe and Finn Patent No. 1,953,529, for Automatic die granted April 3, 1934, but with the additional elements providing for a third position of the chasers, beside the open and normal closed positions, in this third position the chasers being closed slightly more than in normal closed position so as to cut threads under-size. This under-sized-cutting is accomplished for the first few threads at the start of the thread cutting operation so as to cut the work as shown in Figure 6 with the first few threads at $a$ of less than the normal diameter, say, for example .010″ under-size, whereupon the chasers are allowed to separate slightly to normal thread cutting positions where they continue to cut threads of normal diameter as at $b$ until the work has been threaded to the desired extent. The die is thereupon automatically opened so that the chasers are entirely freed from the work, and the die is thereafter retracted. The initial threads cut to smaller than normal diameter make it easy to start the threaded engagement of the work piece into a nut or other internally threaded part into which it is desired to insert it, the initial under cut threads guiding the threaded piece into the nut until such time as the normal size threads engage in the nut and thread thereinto as in usual practice. As shown, the die comprises a head 1, the major portion of the length of which is externally cylindrical, but which at its forward end has an outwardly extending flange 2 of considerably larger diameter than the remainder of the head. The forward face of this flange 2 is provided with dovetail slots 3 extending substantially radially for the reception of mating dovetail portions 4 of a plurality of chaser holders 5 which rest flat against the forward face of the flange 2 but may be moved toward and from the central longitudinal axis of the head.

Each of the chaser holders 5 is provided with a dovetail slot 6 in one side face for the reception of the mating dovetail 7 of a thread cutting chaser 8, which may be fixed by any suitable means in adjusted lengthwise position in its chaser holder. As shown best in Figure 3, four chasers and holders may be employed, the chasers being of the well known tangent type. The flange 2 of the die head is provided with four radial slots 9 therethrough through which are slidable fingers 10 of a chaser moving member 11. This chaser moving member 11 is mounted for sliding motion axially of the die on the relatively large diameter portion 12 of the head back of the flange 2, and each of the fingers 10 flares outwardly away from the axis and engages in a mating hole 14 in a chaser holder, the holes 14 thus being inclined outwardly away from the axis of the die toward their outer ends. It will be evident that by moving the member 11 axially along the portion 12 of the die head, the chaser holders, and with them the chasers, will be moved in or out with respect to the axis of the die, and as the fingers 10 and their corresponding holes 14 are symmetrically disposed, the chasers are moved together by equal amounts in either direction.

There are three axial positions which may be assumed by the member 11. As shown in Figure 2 where the member 11 is at its limit of motion to the left, the chaser holders are in their inmost positions where the chasers cut the threads under-size so as to cut the threads a shown in Figure 6. By moving the member 11 slightly to the right to the position shown in Figure 7, the chaser members 5 are moved outwardly slightly in which position the chasers are spaced to cut threads of normal diameter, this position being the normal closed position of the die. The third axial position of the member 11 is shown in Figure 8, this being the extreme right hand position of the member 11 wherein the chaser holders 5 are at their extreme outer position and with the chasers 8 out of contact with the work. This is the open position of the die.

The member 11 is normally pressed toward the full open position of Figure 8, as by a plurality of springs 20, which are seated at opposite ends in sockets 21 in the rear face of the flange 2 and in sockets 22 in the opposed face of the member 11. The right hand limit of motion of the member 11 is determined by a fixed stop ring 25 threaded onto a shoulder portion 26 of the head 1 and locked in adjusted position as by means of a set screw 27 threaded in the ring 25 and bearing against the portion 26 of the head. Angular adjustment of the ring 25 which determines its axial position, determines the setting of the chasers for their closed positions, the under-cut closed position being a fixed amount closer than the normal closed position. The constants of the parts then determine the undersize, and the open positions. Between this fixed stop ring 25 and the member 11 are other ring members which depend upon the angular adjustment of certain of them to determine the axial positions of the member 11. To the left of the fixed abutment ring 25 there is positioned a thrust ball bearing 28 against the opposite face of which bears a rockable ring member 29 shown detached in Figure 12. Next in order is a ring member 30 which is keyed to a portion 31 of the head and has limited axial motion therealong but is prevented by this key connection from rotation relative to the head. As shown in Figures 2, 7 and 8, this key connection comprises a flat key head 32 riding in the key slot 33 of the member 30 and having a shank 34 engaging in a perforation 35 in the portion 31 of the head. Bearing on the opposite face, or to the left on the ring 30, is a rockable ring member 40 mounted to rock on the portion 31 of the head coaxial therewith.

The rings 29 and 40 are latches, both spring pressed toward latching angular positions, and successively turned to releasing positions as the die threads the work. When both rings are in latching position, the chasers are closed to cut undersize threads. The latch ring 29 is first turned to releasing position which allows the chasers to move outwardly to normal cutting positions, and at the end of the threading action the latch ring 40 is rocked to releasing position to allow the die to open. The latch rings are moved to latching positions by springs in the reverse order when the die is closed, as will later appear.

Figures 3, 5:
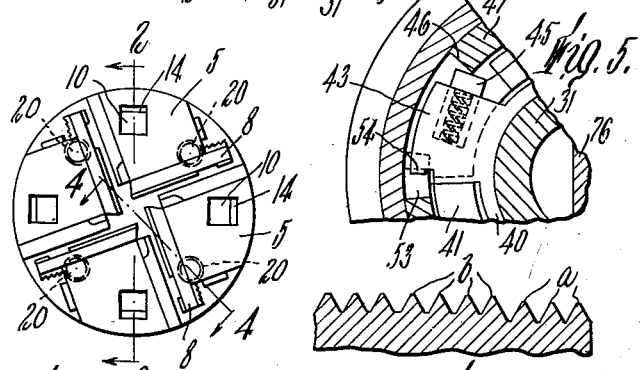
Figure 3 is a front end elevation of the die to a small scale.
Figure 5 is a fragmentary sectional view on line 5—5 of Figure 2.

The rear face of the chaser moving member 11 is provided with spaced rearwardly projecting lugs 41, each of which in one angular position of the ring 40, bears against a side face of a radially projecting lug 43 of the ring member 40 as shown best in Figure 5, and the ring member 40 is normally urged toward this angular position as by a spring pressed plug 45 carried thereby which reacts against an edge face 46 of a sleeve 47 which surrounds and encloses the axially movable stop ring 30, the rockable ring 29, the ball bearing 28 and the forward portion of the fixed stop ring 25. This arrangement is similar to the construction shown in the Bysshe and Finn patent to which reference has been made and which may be examined for a more complete showing of this portion of the apparatus, the patent, however, lacking the ring 29, thrust bearing 28 and the lugs 60 on a ring, corresponding to the ring 30. The sleeve 47 has mounted thereon with a press fit, a release sleeve 50 which has a forward enlarged diameter portion 51 surrounding the member 11 and acting as a dust guard to prevent the entrance of foreign matter into the interior of the die. The sleeve 50 also has an actuating flange 52 in accordance with usual practice. As the sleeve members 47 and 50 are press fitted they function as an integral piece.

The rear or right hand face of the ring member 30 differs from the corresponding part shown in the Bysshe and Finn patent in that it is provided with a plurality of lugs 60 (herein shown as four) which, in one angular position of the rockable ring member 29, overlap similar lugs 61 on the forward face of the ring member 29. When the ring members 29 and 40 are each in one angular position, which is shown in Figure 2, the lugs 60 and 61 of the members 30 and 29 are in engagement, and the lugs 41 and 43 of the chaser moving member 11 and the ring 40 are in engagement, the member 11 then being held in the position shown in Figure 2 at its extreme forward position by the engagement of the member 11 on the member 40, the member 40 on the member 30, the member 30 on the member 29, the member 29 on the ball bearing 28, and the ball bearing 28 on the fixed abutment ring 25. The ring 29 is normally urged toward this angular position where its lugs 61 overlap the lugs 60 on the axially movable abutment 30, this being accomplished by a spring 65 (see Figures 9 and 10) which reacts between a pin 66 projecting inwardly from the ring member 29 and a pin 67 projecting outwardly from the portion 26 of the head 1. The ring 40 is similarly pressed toward its one angular position by the spring pressed plunger 45 as has already been described.

In order that the die may open slightly after it has cut the desired number of under-size threads so that the remaining threads may be cut to normal size, means are provided by which the ring member 29 is turned from the position shown in Figures 2 and 9, where the lugs 60 and 61 overlap, to the position where the lugs 61 are brought out of registration with the lugs 60 as shown in Figure 10. This permits the stop ring 30 to move axially to the right slightly, which allows the rockable ring 40 and the chaser moving member 11 to move with it into the position shown in Figure 7 where the chasers have been moved outwardly to normal closed die position. As shown, this is accomplished by the following mechanism:

The die head 1 is provided with a central recess or bore within which is axially slidable a plunger 70. The outer end portion of this plunger is shown as cylindrical at 71 and is slidably guided within the bore 72 of the recess. Its outer end may have a threaded opening for the reception of a threaded abutment 73 which may be fixed in position as by a lock nut 74. The length of this abutment 73 is so chosen that it contacts with the work piece as soon as the work piece has been threaded for a few turns to the extent desired for the under-size threads, whereupon further feed of the die onto the work causes the plunger 70 to be pressed rearwardly. This is against the action of a spring 75 which bears at its forward end against the rear end of a shank portion 76 of the plunger and at its opposite end on the base of a socket member 78 which is secured in the rear end of the central bore of the head as by a cross pin 79. The shank portion 76 extends through a guide slot 80 in a sleeve 81 which is arranged transverse to the axis of the die head and is seated in a laterally extending hole 82 therethrough. This sleeve 81 houses a pair of cam elements, herein shown as balls 84, against the inner faces of which bear edge cam faces 85 of the shank 76. The balls project into recesses 88 in the inner wall of the rocking ring 29. In this position shown in Figure 9, where the rocking ring 29 is in such angular position that its lugs 61 are engaged by the lugs 60 of the ring 30, the balls 84 may only partly enter the sockets 88, which are out of axial alinement with the sleeve 81. The cam edges 85 of the shank 76, however, are provided with low portions at their outer ends and rises 90 leading from the low portions to the high portions 91. When the low portions are opposite to the balls 84 as shown in Figure 9, the balls may be pressed inwardly by the edge portions of the recesses 88 to allow the ring 29 to take the angular position shown, but when the plunger is moved backwardly by engagement of its abutment by the work, the rises 90 wedge the balls 84 outwardly, which, in turn, wedge the ring 29 angularly to the position shown in Figure 10, bringing the lugs 61 thereon out of register with the lugs 60 of the ring 30, whereupon the ring 30 and the parts bearing thereon, and including the chaser moving member 11, snap quickly to the right to the position shown in Figure 7. All further cutting motion of the die is accomplished with full diameter threads, this being the normal closed condition of the die. As the plunger continues to be pressed inwardly, the balls 84 ride on the high level portions 91 of the shank and remain in the same outward positions shown in Figure 10. This action takes places until the normal threading has proceeded to the desired extent, at which time, and as shown in the Bysshe and Finn patent to which reference has been made, the sleeves 50 and 47 are held against forward motion with the die, whereupon a cam face 53 on the sleeve 47 engaging a mating cam face 54 on the ring 40, as shown in Figure 13 of that patent, rocks the ring 40 against the action of the spring pressed plug 45 sufficiently to bring the lugs 43 out of register with the lugs 41 of the chaser moving member 11, thus releasing this member 11 so that the springs 20 drive it to its extreme right hand position, as shown in Figure 8, opening the die. The die is then pulled back from the work by means which engages the sleeve 50 in the well known manner, and continued motion of the die head while the sleeve 50 is held against further backward motion, pulls the ring 40 back from the chaser moving member 11 so that it may be returned by the spring pressed plug 45 to its obstructing angular position, its lugs 43 overlapping the lugs 41, and also allows the spring 75 to move the plunger 70 forwardly, allowing the balls 84 to be retracted by the wedging pressure of the wall of the recesses 88 thereon under the action of the spring 65, whereupon the ring 29 may be turned back to its locking angular position, springs 92 seated in sockets therein and bearing against the ring 30, serving to separate the rings 29 and 30 sufficiently for the lugs 61 to again overlap the lugs 60. The die is then in its extreme closed position for cutting under-sized threads and ready for a succeeding threading operation.

From the foregoing description of an embodiment of this invention, it should be evident to those skilled in the art that various changes and modifications might be made without departing from the spirit or scope of this invention.

I claim:

1. A die comprising a head, chasers carried by said head for motion from and toward an axis of said head, movable means carried by said head for simultaneously moving said chasers toward or away from said axis, means tending to move said moving means to chaser-open position with said chasers remote from said axis, a releasable latch carried by said head for holding said moving means in normal die-closed position, a second latch carried by said head for holding said moving means in a position beyond normal die-closed position wherein said chasers are positioned to cut the work under-size when said first-mentioned latch is in die-closed position, means acting upon said second latch for releasing said second latch after a predetermined extent of threading to permit said die to assume normal die-closed position, means acting on said first-mentioned releasable means for releasing said first-mentioned latch after a predetermined further extent of threading to permit said die to open, and means actuable to close said die to under-size cutting condition.

2. A die comprising a head, chasers carried by said head for motion from and toward an axis of said head, movable means carried by said head for simultaneously moving said chasers toward or away from said axis, means tending to move said moving means to chaser-open position with said chasers remote from said axis, a releasable latch carried by said head for holding said moving means in normal die-closed position, a second latch carried by said head for holding said moving means in a position beyond normal die-closed position wherein said chasers are positioned to cut the work under-size when said first-mentioned latch is in die-closed position, means acting upon said second latch for releasing said second latch after a predetermined extent of threading to permit said die to assume normal die-closed position, means acting on said first-mentioned latch for releasing said first-mentioned latch after a predetermined further extent of threading to permit said die to open, means actuable to close said die to under-size cutting condition, and yielding means acting when said actuable means closes said die to position each of said latches in die-closed holding condition.

3. A die comprising a head, chasers carried by said head for motion from and toward an axis of said head, means carried by said head and movable longitudinally of said axis and operatively connected to said chasers to cause such longitudinal motion of said means to move said chasers toward and from said axis to close and open said die, a pair of stop members, one of said stop members being fixed to said head and the other of said stop members being movable on said head longitudinally to said axis, a member rockable about said axis between said stop members, said movable stop member and said rockable member having abutments cooperating in one angular position of said rockable member to hold said movable stop member in one axial position and in another angular position of said rockable member to permit said movable stop member to move axially toward said fixed stop member a predetermined distance, a second rockable member bearing against said movable stop member, said second rockable member and said opening and closing means having parts cooperating in one angular position of said second rockable member to hold said means in one position relative to said fixed member and in another angular position to permit said means to move to another axial position nearer to said fixed stop member, means resiliently pressing said chaser moving means toward said fixed stop member, said chaser moving means when farthest from said stop member holding said chasers in closed position cutting below normal thread size, and when said chaser moving means is nearest to said fixed member, as when both rocking members are in said other angular positions, to hold said chasers in die-open positions and when in an intermediate position when said first-mentioned rockable member is in its other angular position and said second rockable member is in said one angular position to hold said chasers in normal thread cutting closed position, means for moving said moving means against the action of said pressing means to close said die to under-size thread cutting condition, and means tending to rock said rockable members each to said one angular position, cam means carried by said head for turning said first-mentioned rockable member to its other position when said die has cut a predetermined distance, and means for turning said second rockable member to its other angular position when said die has threaded the work to a predetermined further distance.

4. A die comprising a head, a plurality of chasers movably carried by said head for motion from and toward the axis of said head, a chaser moving member carried by said head for motion longitudinally of said axis and having operative connections to said chasers causing the motion of said member to move said chasers between a normal die-closed condition and a further closed condition for cutting under-sized threads, yielding means acting on said chaser moving member tending to open said die, a member fixed to said head, a member carried by said head for rocking motion and operatively bearing on said fixed member, a second member carried by said head and movable along said axis with said chaser moving member, said second member and said rockable member having engaging parts effective in one angular position of said rockable member to hold said chaser moving member in under-size cutting axial position and in another angular position permitting said chaser moving member to move toward said fixed member to condition said die for normal size threading, means effective to rock said rockable member from said one to said other angular position after a predetermined distance of under-size threading, yielding means for returning said rockable member to said one position on separation of said second member and rockable member, and means effective on said second member after the completion of the threading operation to produce such separation.

5. A die comprising a head, a plurality of chasers movably carried by said head for motion from and toward the axis of said head, a chaser moving member carried by said head for motion longitudinally of said axis and having operative connections to said chasers causing the motion of said member to move said chasers between a normal die-closed condition and a further closed condition for cutting under-sized threads, yielding means acting on said chaser moving member tending to open said die, a member fixed to said head, a member carried by said head for rocking motion and operatively bearing on said fixed member, a second member carried by said head and movable along said axis with said chaser moving member, said second member and said rockable member having engaging parts effective in one angular position of said rockable member to hold said chaser moving member in under-size cutting axial position and in another angular position permitting said chaser moving member to move toward said fixed member to condition said die for normal size threading, said head having an axial opening therein, a cam plunger slidable in said opening and having a work-engaging abutment, a spring seated in said head and bearing on said plunger, and operative connections between said plunger and rockable member causing the axial motion of said plunger against the pressure of said spring by pressure of work on said abutment to rock said rockable member from said one to said other position and permit said die to open from under-size cutting to normal size cutting condition.

6. A die comprising a head, a plurality of chasers movably carried by said head for motion from and toward the axis of said head, a chaser moving member carried by said head for motion longitudinally of said axis and having operative connections to said chasers causing the motion of said member to move said chasers between a normal die-closed condition and a further closed condition for cutting under-sized threads, yielding means acting on said chaser moving member tending to open said die, a member fixed to said head, a member carried by said head for rocking motion and operatively bearing on said fixed member, a second member carried by said head and movable along said axis with said chaser moving member, said second member and said rockable member having engaging parts effective in one angular position of said rockable member to hold said chaser moving member in under-size cutting axial position and in another angular position permitting said chaser moving member to move toward said fixed member to condition said die for normal size threading, said head having an axial opening therein, a cam plunger slidable in said opening and having a work-engaging abutment, a spring seated in said head and bearing on said plunger, operative connections between said plunger and rockable member causing the axial motion of said plunger against the pressure of said spring by pressure of work on said abutment to rock said rockable member from said one to said other position and permit said die to open from under-size cutting to normal size cutting condition, another yielding means acting on said rockable member tending to hold said rockable member in said one angular position, and means acting on said second member after a thread cutting operation to separate said second member from said rockable member sufficiently for said other yielding means to return said rockable member to said one angular position.

7. A die comprising a head, a plurality of chasers movably carried by said head for motion from and toward an axis of said head, a chaser moving member carried by said head for motion longitudinally of said axis and having operative connections to said chasers causing the motion of said member to move said chasers between a normal die-closed condition and a further closed condition for cutting under-sized threads, yielding means acting on said chaser moving member tending to open said die, a member fixed to said head, a member carried by said head for rocking motion and operatively bearing on said fixed member, a second member carried by said head and movable along said axis with said chaser moving member, said second member and said rockable member having engaging parts effective in one angular position of said rockable member to hold said chaser moving member in under-size cutting axial position and in another angular position permitting said chaser moving member to move toward said fixed member to condition said die for normal size threading, said head having an axial opening therein, a cam plunger slidable in said opening and having a work-engaging abutment, a spring seated in said head and bearing on said plunger, said head having a guide passage opposite to said rockable member transverse to said axis, said rockable member having an internal recess registering with said passage when said rockable member is in said other angular position and partly out of such registry when said rockable member is in said one angular position, a cam element slidable in said passage into said recess and when pressed into said recess forcing said rockable member angularly into said other angular position, said plunger having a cam surface in engagement with said cam element and having a rise positioned to force said cam element outwardly into said recess when said plunger is pushed rearwardly by pressure of work on said abutment to rock said rockable member from said one to said other position and permit said die to open from under-size cutting to normal size cutting condition.

8. A die comprising a head, a plurality of chasers movably carried by said head for motion from and toward the axis of said head, a chaser moving member carried by said head for motion longitudinally of said axis and having operative connections to said chasers causing the motion of said member to move said chasers between a normal die-closed condition and a further closed condition for cutting undersized threads, yielding means acting on said chaser moving member tending to open said die, a member fixed to said head, a member carried by said head for rocking motion and operatively bearing on said fixed member, a second member carried by said head and movable along said axis with said chaser moving member, said second member and said rockable member having engaging parts effective in one angular position of said rockable member to hold said chaser moving member in under-size cutting axial position and in another angular position permitting said chaser moving member to move toward said fixed member to condition said die for normal size threading, said head having an axial opening therein, a cam plunger slidable in said opening and having a work-engaging abutment, a spring seated in said head and bearing on said plunger, said head having a guide passage opposite to said rockable member transverse to said axis, said rockable member having an internal recess registering with said passage when said rockable member is in said other angular position and partly out of such registry when said rockable member is in said one angular position, a cam element slidable in said passage into said recess and when pressed into said recess forcing said rockable member angularly into said other angular position, said plunger having a cam surface in engagement with said cam element and having a rise positioned to force said cam element into said recess when said plunger is pushed rearwardly by pressure of work on said abutment to rock said rockable member from said one to said other position and permit said die to open from under-size cutting to normal size cutting condition, another yielding means acting on said rockable member in said one angular position, and means acting on said second member after a thread cutting operation to separate said second member from said rockable member sufficiently for said other yielding means to return said rockable member to said one angular position.

9. A die comprising a head, chasers carried by said head for motion from and toward an axis of said head, a member movably carried by said head and operatively connected to said chasers for simultaneously moving said chasers toward or away from said axis from one to another of three positions relative to said head, in the first of which positions said chasers are closed beyond normal die closed position in relation to cut undersized threads, in the second of which positions said chasers are in normally closed relation, and in the third of which positions said chasers are in die-open relation, and a pair of elements movably carried by said head for successive movement from inoperative positions as said die is threading a work piece, said die including mechanism actuated by such movement of the first of said elements to be moved during a threading operation, to move said member from said first position to said second position, and said die including mechanism actuated by such movement of the other of said elements after the movement of said first element, to move said member from said second position to said third position.

ROBERT R. FINN.

REFERENCES CITED

The following references are of record in the file of this patent:

UNITED STATES PATENTS

| Number | Name | Date |
| --- | --- | --- |
| 1,114,704 | Scott | Oct. 20, 1914 |
| 1,953,529 | Bysshe et al. | Apr. 3, 1934 |
| 2,026,471 | Hoelzel | Dec. 31, 1935 |
| 2,082,757 | Reimschissel | June 1, 1937 |
| 2,163,598 | Hogg | June 27, 1939 |
| 2,195,837 | Breitenstein | Apr. 2, 1940 |
| 2,265,764 | Robertson | Dec. 9, 1941 |
| 2,291,919 | Reimschissel | Aug. 4, 1942 |